Feb. 11, 1930.     A. Y. DODGE     1,746,822
EXPANDING CLUTCH
Filed Nov. 29, 1926
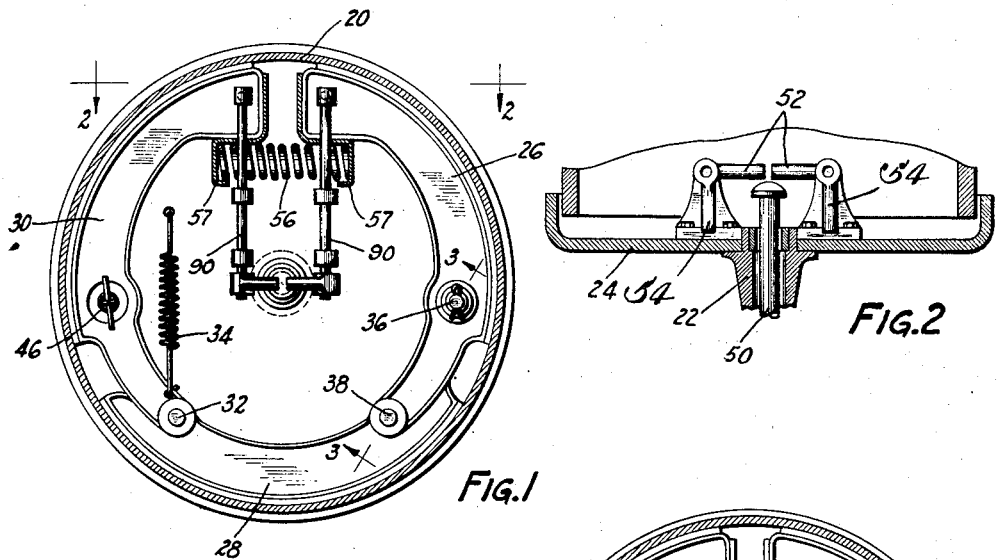
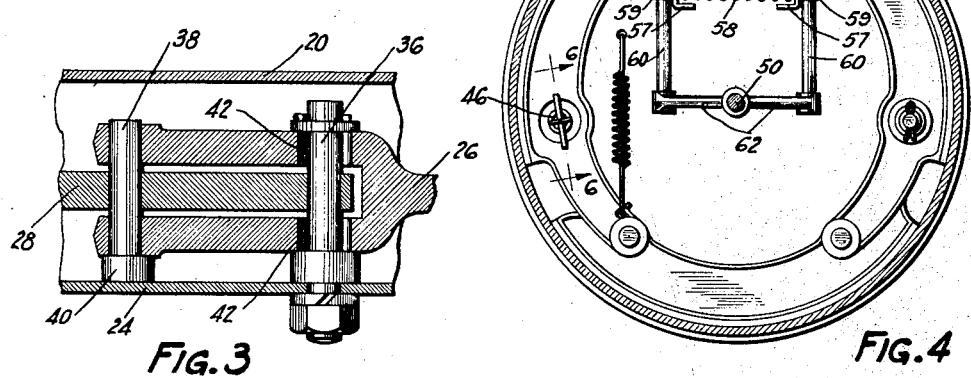
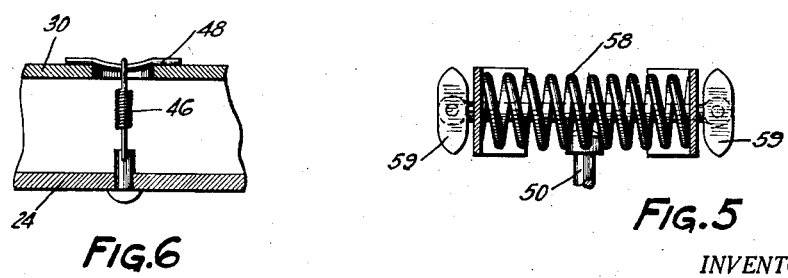
INVENTOR.
ADIEL Y. DODGE
BY
ATTORNEY Patented Feb. 11, 1930

1,746,822

UNITED STATES PATENT OFFICE

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS

EXPANDING CLUTCH

Application filed November 29, 1926. Serial No. 151,320.

This invention relates to friction clutches of the radially-expansible type, and is illustrated as embodied in an automobile clutch. An object of the invention is to provide a clutch having exceptionally powerful frictional engagement, preferably secured by arranging one friction shoe to force another against the flywheel, or an equivalent rotatable member, when turning in the normal direction of rotation, while at the same time arranging a considerable clutching action in the reverse direction of rotation, preferably by the provision of an additional shoe.

Various features of novelty relate to pivotally mounting the shoes to secure the desired result, to an arrangement permitting the shoes to overlap each other to increase the area of frictional engagement, and to novel operating means for the clutch.

The above and other objects and features of the invention, including various novel combinations of parts and desirable particular constructions, will be apparent from the following description of two illustrative embodiments shown in the accompanying drawings, in which:

Figure 1 is a view in section through the rotatable driving element and showing the shoe-clutching means and release mechanism therefor in side elevation;

Figure 2 is a view generally on the line 2—2 of Figure 1, but with the friction shoes removed and partly broken away in section centrally of the clutch and showing the clutch release in end elevation;

Figure 3 is a section taken on the line 3—3 of Figure 1 showing the overlapping of two of the friction shoes;

Figure 4 is a view similar to Figure 1 disclosing a modified form of clutch release mechanism;

Figure 5 is a partial section on the line 5—5 of Figure 4 showing part of the release and engaging means;

Figure 6 is a section taken on the line 6—6 of Figure 4 indicating in detail the anti-rattle spring mechanism.

The clutch mechanism of Figures 1-3 comprises a rotatable member such as a flywheel 20 having an internal cylindrical clutch surface, a shaft 22 arranged coaxially of the flywheel, and novel clutch mechanism for connecting and disconnecting the shaft and flywheel. On the end of shaft 22 there is a suitable support, such as a plate 24, for the clutch mechanism.

Within the flywheel 20 are novel friction shoes 26, 28, and 30 arranged end to end. Shoe 30 is preferably connected to the end of shoe 28 by a floating pivot 32, so that shoe 30 normally acts to engage shoe 28 with the flywheel against the resistance of a return spring 34. Shoes 26 and 28 are pivotally connected at their adjacent ends to the support 24, shoe 26 being forked at its end as shown in Figure 3 to straddle the end of shoe 28 and bring the friction portions of the two shoes close together. In the arrangement shown in Figure 3, shoe 28 is directly connected to support 24 by a pivot 36, while shoe 26 is connected to shoe 28 (and thence through pivot 36 to support 24) by a pivot 38 having an enlarged head 40 slidably engaging the support 24. Pivot 36 passes through relatively large openings 42 in the arms at the end of shoe 26, to give ample clearance. Shoes 26 and 30 are preferably interchangeable.

Shoe 30 may be held laterally by an anti-rattle spring 46, secured at one end to support 24 and at its other end to a pin 48 bridging across the opening 42 in shoe 30 all as disclosed in Figure 6. This anti-rattle structure is not claimed herein, the same forming a subject-matter of application No. 43,951 of Vincent Bendix, filed July 15, 1925.

The clutch engaging and releasing means includes a plunger 50 extending through the shaft 22 and which plunger engages release levers 52 on the inner ends of shafts 90 supported by bearings in brackets on support 24 and having at their outer ends release levers 54 extending through openings in shoes 26 and 30 and operated to release the clutch against the resistance of a clutch-engaging spring 56 compressed and confined between brackets 57 carried by the ends of shoes 26 and 30.

In Figures 4 and 5 I have disclosed a modified form of clutch releasing and engaging mechanism comprising a spring 58 similar to spring 56, which serves as the clutch spring, and is compressed to disengage the clutch by two cams 59 on shafts 60 having arms 62 engaged by the plunger 50.

In either of the aforementioned modifications, suitable adjustable counterweights may be provided to balance the rotating parts.

While several illustrative embodiments of the invention have been described in detail, it is not my intention to limit its scope to those particular embodiments, or otherwise than by the terms of the appended claims.

I claim:

1. Clutch mechanism comprising, in combination, a rotatable member having a substantially cylindrical inside clutch surface, a rotatable shaft arranged coaxially of said member and having a support fixedly mounted at its end, three arcuate friction shoes each approximately 120° long arranged end to end within and engageable with said surface, means secured to the support for restraining movement of the adjacent ends of two of the shoes angularly about the axis of the shaft, means connecting the third shoe to the end of one of said two shoes opposite the restraining means, a spring normally forcing said third shoe and the other of said two shoes apart to clutch the rotatable member and the shaft together and arranged opposite the ends of said shoes, and means movable along the shaft and arranged to compress and release said spring.

2. Clutch mechanism comprising, in combination, a rotatable member having a substantially cylindrical inside clutch surface, a rotatable shaft arranged coaxially of said member and having a support fixedly mounted at its end, a plurality of arcuate friction shoes engageable with said surface and including at least two arranged to overlap at their adjacent ends to bring their friction portions immediately adjacent, means for pivotally connecting said overlapping ends to said support including at least one pivot carried by the support and upon which one of said ends is mounted, a device exerting a constant yielding pressure upon the shoes outwardly against the clutch surface, and means for rendering ineffective said device independently of the rotation of the shaft.

3. Clutch mechanism comprising, in combination, a rotatable member having a substantially cylindrical inside clutch surface, a rotatable shaft arranged coaxially of said member and having a support fixedly mounted at its end, a plurality of arcuate friction shoes engageable with said surface and including at least two arranged to overlap at their adjacent ends to bring their friction portions immediately adjacent, means for pivotally connecting said overlapping ends to said support including one pivot carried by the support and upon which one of said ends is mounted and including a second pivot connecting the other of said ends to the shoe which overlaps it, spring means adapted to constantly exert a pressure for forcing the shoes outwardly against the clutch surface, and means for rendering inoperative said last-mentioned means independently of the rotation of the shaft.

4. Clutch mechanism comprising, in combination, a rotatable member having an internal cylindrical clutch surface, a shaft arranged coaxially of said member and having a support at its end, shoes carried by the support and movable outwardly into engagement with said clutch surface and having adjacent separable ends, a spring compressed between said ends and urging them apart to engage the clutch, levers operable to move the shoes toward each other against the resistance of the spring to release the clutch, shafts operating said levers and extending inwardly from the spring and having other levers adjacent the shaft, and a device movable in the direction of the axis of the shaft and acting on said other levers to release the clutch.

5. Clutch mechanism comprising, in combination, a rotatable member having an internal cylindrical clutch surface, a shaft arranged coaxially of said member and having a support at its end, shoes carried by the support and movable outwardly into engagement with said clutch surface and having adjacent separable ends, a spring compressed between said ends and urging them apart to engage the clutch, operating shafts extending inwardly from the spring coupled with the ends of said shoes, and a device movable crosswise of the axis of the shafts arranged coaxially of the rotatable member, said device coupled with said operating shafts to compress the spring and withdraw the clutch shoes away from the rotatable member.

6. Clutch mechanism comprising, in combination, a rotatable member having an annular internal clutch surface, a rotatable shaft arranged coaxially of said member, a plurality of friction shoes carried by the shaft and adapted to frictionally engage the clutch surface of the rotatable member to couple the member and the shaft together to rotate as one piece, a release spring tending to hold said shoes away from the rotatable member, a clutch spring coupled with the ends of two of said shoes engaging directly therewith and exerting a pressure thereon tending to overcome the release spring and expanding the shoes against the clutch surface of the rotatable member, and manually operable clutch release mechanism engaging said means to release the clutch.

7. Clutch mechanism comprising, in combination, a rotatable member having an annular internal clutch surface, a rotatable shaft arranged coaxially of said member and having a support disposed in proximity thereto, a pair of clutch shoes carried by said support, a clutch spring urging one of said shoes into engagement with the clutch surface of the rotatable member, said shoe coupled with the other shoe of the pair to utilize the torque of the rotatable member to apply said other shoe thereagainst, a release spring acting on said shoes tending to withdrawn them from the rotatable member, said spring being insufficient to overcome the tension of the clutch spring, and manually operable mechanism movable to augment the tension of the release spring to overcome the clutch spring and withdraw said shoes from the rotatable member.

8. Clutch mechanism comprising, in combination, a rotatable member having an annular internal clutch surface, a rotatable shaft arranged coaxially of said member and having a support disposed in proximity thereto, three clutch shoes carried by said support and arranged end to end within said rotatable member to be urged thereagainst, clutch spring mechanism engaging the ends of two of said shoes to urge them frictionally against the rotatable member, one of said shoes adapted to apply the third shoe against the rotatable member, and a manually operable device adapted to overcome said clutch spring and withdraw the shoes from the rotatable member.

In testimony whereof, I have hereunto signed my name.

ADIEL Y. DODGE.